United States Patent [19]
Sharman et al.

[11] 3,754,561
[45] Aug. 28, 1973

[54] FOAM CIRCULATION FLUIDS

[75] Inventors: Samuel H. Sharman, Berkeley; Ralph House, San Pablo; Glen W. Anderson, Oildale, all of Calif.

[73] Assignee: Chevron Research Company, San Francisco, Calif.

[22] Filed: Feb. 4, 1972

[21] Appl. No.: 223,536

Related U.S. Application Data
[62] Division of Ser. No. 779,519, Nov. 27, 1968, abandoned.

[52] U.S. Cl.................. 137/13, 175/69, 252/8.5 C, 252/555
[51] Int. Cl............................................. E21b 21/04
[58] Field of Search...................... 137/13; 166/308, 166/309; 252/8.5 C, 8.5 R, 8.55 R, 8.55 C, 555; 175/69, 71

[56] References Cited
UNITED STATES PATENTS
3,486,560  12/1969  Hutchison et al............... 166/308 X
3,479,285  11/1969  Barthauer.................... 252/8.5 C X FOREIGN PATENTS OR APPLICATIONS
775,142  1/1968  Canada.............................. 252/555

Primary Examiner—Alan Cohan
Assistant Examiner—Gerald A. Michalsky
Attorney—A. L. Snow et al.

[57] ABSTRACT

Detergent-range olefin sulfonates containing a minor amount of $C_9$–$C_{15}$ substantially linear primary alcohols yield aqueous gas-in-liquid foams having exceptionally low resistance to flow. These foams are especially effective circulation fluids in oil wells when for each 100 parts of the sulfonate from 10 to 25 parts of the alcohol is present in the foaming agent mixture.

4 Claims, 1 Drawing Figure

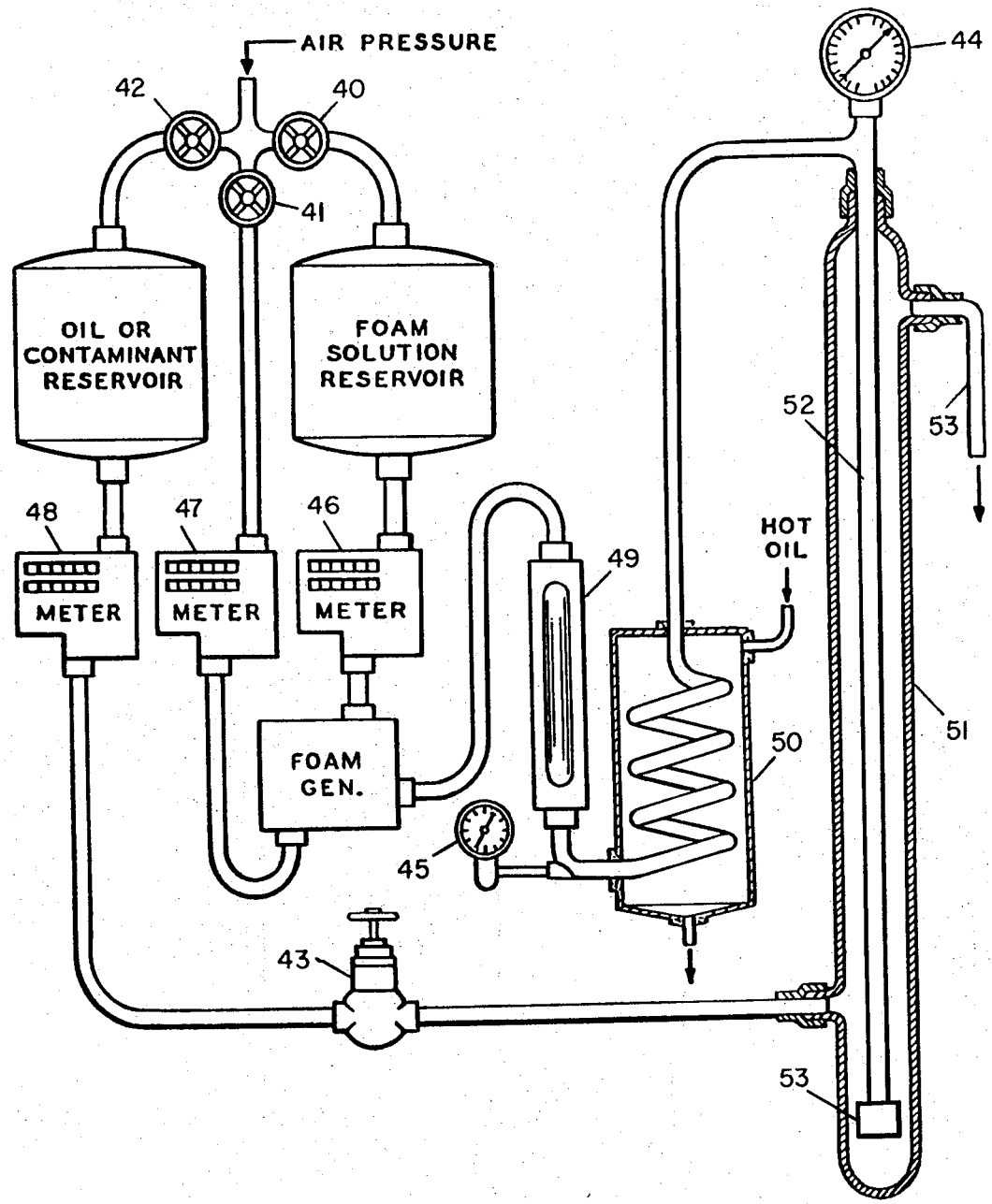

FOAM CIRCULATION FLUIDS

This is a division, of application Ser. No. 779,519, filed Nov. 27, 1968, now abandoned.

This invention relates to air-in-water foam circulation fluids for wells. More particularly, it relates to foam circulation fluids having improved flow characteristics in wells. Still more particularly, it relates to novel foaming agents obtained by incorporating a minor amount of an intermediate primary alcohol into a detergent range olefin sulfonate.

It is known to employ air-in-water foams as circulation fluids in the drilling of wells and more particularly to employ them in the removing of liquids and small solids, chips and the like from well bores during drilling and well cleaning operations. Customarily in the past, a foaming agent, air or air and water, are separately introduced into the well bottom, and a foam is generated in situ. More recently, markedly improved foam circulation fluid systems have been utilized by preformation of the foam out of contact with the well bore environment, for example at the well-head with the advantage being in the main that better and more stable foam can be produced. There is, however, an appreciable work requirement in circulating stable foams in a well, particularly in connection with a full circuit flow path as where foam is generated at the well-head. Consequently there is a need to develop foams having reduced resistance to flow in a well annulus or pipe string.

It has now been found that air-in-water foam circulation fluids having improved circulation characteristics are obtained by the use of detergent range olefin sulfonate foaming agents having a minor amount of a primary, intermediate, substantially, linear alcohol incorporated therein. Surprisingly, air-in-water well circulation foams obtained by the use of the foregoing foaming agent mixtures exhibit substantially reduced resistance to flow in a well bore, pipe string or the like. Other advantages incidental to the practice of the instant invention include improvements in foam structure and foam stability.

By olefin sulfonate herein is meant by definition sulfonate obtained by the reaction of sulfur trixoide with an olefinic hydrocarbon followed by neutralization and hydrolysis with inorganic-acid-binding alkali such as sodium hydroxide, sodium oxide, sodium carbonate or the equivalent base.

By a detergent range olefinic hydrocarbon as used herein is meant by definition a hydrocarbon which contains a single carbon-carbon double bond, which is otherwise saturated and which contains a carbon atom content in the range 10 to 20 inclusive.

By an intermediate, substantially, linear, primary alcohol as used herein is meant by definition an alcohol of the formula $$RCH_2OH$$

in which R is an alkyl hydrocarbon radical having a carbon atom content in the range 8 to 14, inclusive, and is a straight chain or an alkyl group containing a methyl group as the sole branch thereof.

By a minor amount of intermediate alcohol as used herein is meant by definition in parts by weight based upon 100 parts of olefin sulfonate from about 1 to 55 parts of the alcohol.

The olefin sulfonate suitable for use in the instant invention is obtained by the reaction of sulfur trioxide with an olefinic hydrocarbon. In general for each mol of olefin from about 0.9 to 1.4 mols of sulfur trioxide is reacted with the hydrocarbon at a temperature in the range from about 0° to 100° C. In the upper portion of the temperature range, ~ 50° to 100° C., the reaction for all practical purposes is instantaneous. At the lower temperatures, 0°–40° C. the reaction time is longer and may be as much as 0.5 to 1.0 hour in duration. For the neutralization and hydrolysis of the olefin sulfonation product, from about 0.9 to 1.5 equivalents of base is in general required. Representative prior art sulfonations and hydrolyses etc. are to be noted in British Pat. No. 983,056, and U.S. Pat. Nos. 2,061,619; 2,061,620 and 2,094,451, as well as in "Alpha-Olefins in the Surfactant Industry" by T. H. Liddicoet, The American Oil Chemists' Society, November 1963, Vol. 40, No. 11, pp. 631–636; and "Alpha-Olefin Sulfonates from Commercial $SO_3$-Air Reactors" by D. M. Marquis et al., ibid, Vol. 43, No. 11, pp. 607–614 (1966).

In a preferred embodiment an air-in-water foam for use as a circulation fluid in an oil well is obtained by employing a mixture of $C_{15}$–$C_{18}$, neutralized and hydrolyzed, $\alpha$-olefin, sulfonate, foaming agent which contains dodecyl alcohol. For each 100 parts by weight of the sulfonate, the mixture contains 19 parts by weight of the alcohol. The $\alpha$-olefin mixture used for the preparation of the sulfonate contains the $C_{15}$, $C_{16}$, $C_{17}$ and $C_{18}$ fractions in the proportions 30, 29, 28 and 13 weight percent respectively. In making up the aqueous solution for use in the foam generation, about 0.25 gram of the mixture is added to 100 grams of water and the resulting solution is used in a suitable foam generator (see for example Encyclopedia of Chemical Technology, Volume 6, Interscience Encyclopedia, Inc., N.Y. (1951); U.S. Pat. No. 3,212,762) to produce a satisfactory foamed well circulation fluid, e.g., one in which the volume ratio, standard cubic feed of air per gallon of foamable solution, for the foam is in the range from about 3 to 50.

The amount of the intermediate alcohol required to reduce the back pressure in the circulation of a detergent range olefin sulfonate derived foam varies depending upon the particular sulfonate. In general, at least an amount in the range 1–4 parts of the alcohol per 100 parts of the sulfonate is necessary to achieve a satisfactory reduction in the back pressure. When the relative amount of the alcohol is in the range from about 10 to 35 parts, the back pressure reduction is in general optimum. As the relative amount of alcohol is increased above the optimum, side effects such as a reduction in foam stability renders the foaming agent mixture less satisfactory. In general for useful foam production, the relative amount of the alcohol will be less than 50–60 parts per 100 parts of the sulfonate. The range 10 to 25 parts of the alcohol per 100 parts of the sulfonate is preferred.

The molecular range and type of alcohols which are effective for the improvement of flow characteristics of foams is limited. The $C_8$ alcohols are ineffective as are also the $C_{16}$ alcohols. In general those in the range $C_9$–$C_{15}$ are satisfactory while the $C_{10}$–$C_{13}$ alcohols and molecular mixture thereof are preferred.

Only primary alcohols are useful in the practice of the instant invention, and of these only the straight chain or substantially straight-chain, i.e., having but a single methyl branch, species are effective. Dodecyl alcohol is the preferred foam moderator.

Detergent range olefin sulfonates in general yield foams whose flow characteristics, including stability and resistance to flow, are improved in the practice of the instant invention. In general for each 100 parts by weight of water, an amount of the olefin sulfonate in the range from about 0.05 to 5 parts is required to produce a satisfactory foamable solution suitable for the production of foamed well circulation fluids.

The amount of the instant foaming agent mixture which should be used relative to water in preparing a foamable solution varies depending upon the particular mixture. In general at least about 0.05 to 0.1 parts per 100 parts of water should be used. Best results obtain when the relative amount of the agent is in the range from about 0.2 to 1 part of the mixture. Larger relative amounts can be satisfactorily used, for example, even up to 5 parts, but such use adds substantially to the cost of the foam produced therefrom, and there is usually little or no corresponding advantage to be gained thereby.

The foaming agent composition of the instant inventions are conveniently handled and transported in the form of a mixture of solids or of an aqueous concentrate. Substantial savings in freight and packaging costs and the like are thus enjoyed since water, which is the major component of the foamable solution, is usually available at or near a well site.

In the case of the powdered agent, best results are experienced when the powder is obtained from a spray drying operation wherein an aqueous solution containing the desired relative amounts of the olefin sulfonate and of the intermediate alcohol is spray dried in a conventional spray drying operation (see Encyclopedia of Chemical Technology, Kirk Othmer, Vol. 5, pp. 255–288).

Where aqueous concentrates of the instant foaming agent mixture are preferred, the concentrate should contain at least about 25 weight per cent of the alcohol-sulfonate mixture. More concentrated solutions up to the saturation value are preferred in view of the lower relative amount of water. Where excess alcohol-sulfonate is present in the aqueous mixture, i.e., a slurry of solid in saturated liquid, the mixture is relatively inconvenient with respect to use in the field.

Representative olefin sulfonates which are useful in the preparation of the instant foaming agent mixtures include the sulfonates obtained from the reaction of sulfur trioxide with decene-1, dodecene-1, dodecene-2, dodecene-4, tetradecene-1, tetradecene-5, eicosene-1, eicosene-6, tridecene-1, tridecene-4, pentadecene-1, pentadecene-6, nonadecene-1, heptadecene-1, undecene-3, 3-methylpetadecene-1, and the like molecular species, as well as molecular mixtures such as full range mixtures of $C_{10}$–$C_{20}$-α-olefins; two component, three component, four component and the like partial molecular range mixtures, i.e., $C_{10}$, $C_{11}$, $C_{12}$ or $C_{13}$, $C_{14}$, $C_{15}$ or $C_{12}$, $C_{13}$, $C_{15}$, $C_{16}$ or $C_{15}$, $C_{16}$, $C_{17}$, $C_{18}$ (preferred) or two molecular component mixtures such as $C_{15}$, $C_{16}$ or $C_{17}$, $C_{18}$ and the like mixtures; as well as corresponding internal olefin mixtures including equilibrium olefin mixtures or partially isomerized α-olefin mixtures and the like alkenes. Straight chain 1-alkenes are preferred sources for the sulfonates of the present invention and of these those obtained from thermal cracking of petroleum wax are most preferable. Other sources of satisfactory olefin sulfonates are those obtained from such olefins as ethylene polymers, i.e., using trialkyl aluminum, or from monochlorination of n-paraffins followed by elimination of hydrogen chloride.

Representative alcohols which are useful in the preparation of the subject foaming agent mixture include nonyl, decyl, undecyl, dodecyl, tridecyl, tetradecyl and pentadecyl alcohol, alone or in molecular mixtures. Other suitable alcohols include 5-methyl-1-dodecanol, 7-methyl-undecanol, 9-methyl-1-decanol, 13-methyl-1-tetradecanol and the like alkanols as well as molecular mixtures thereof.

The oxo-alcohol mixtures obtained from the oxonation of 1-alkenes and mixtures thereof having the required carbonation content are preferred for use in the instant alcohol-sulfonate mixtures.

The following examples further illustrate the present invention.

EXAMPLES 1 AND 2

In these examples comparative demonstrations were carried out in a unit as shown in the FIGURE which is a diagrammatic representation of a laboratory foam testing unit in whcih a preformed foam can be subjected to simulated well conditions. Valves 40, 41, 42 and 43 provide control of the unit as desired. Gauges 44 and 45 indicate line pressures, and meters 46, 47 and 48 permit determination of flow rates and quantities transported. Item 49 is a sight glass for viewing the generated foam. Item 50 is a heating coil and surrounding temperature control bath. Cylinder 51 is a heavy-duty glass unit in which the central delivery line 52 is analogous to a well pipe string. Detachable porous core 54 may be an oil sandcore, and the annulus of cylinder 51 corresponds to a well annulus. Foam delivered via line 52 passes through core 54 or oil- and tar-contaminated sand as desired, or through oil or brine or mixtures thereof placed in the lower portion of cylinder 51, thence up the annulus and is exited via line 53. The effluent from line 53 is caught in a suitable vessel, i.e., a glass beaker, graduated cylinder, etc., and examined for foam condition, liquid or solid, conveyed by the foam from the "well" and the like.

Foamable solutions were prepared by dissolving a $C_{15}$–$C_{18}$-α-olefin sulfonate in water as follows:

|  | Solution A | Solution B |
|---|---|---|
| Water, gr | 100 | 100 |
| olefin sulfonate[1], gr | 0.2 | 0.2 |
| 1-dodecanol, gr | None | 0.04 |

[1]Sodium salt of olefin sulfonate obtained from n-α-olefin mixture having the following per cent composition by weight: $C_{15}$, 30%; $C_{16}$, 29%; $C_{17}$, 28%; and $C_{18}$, 13%

The foregoing solutions were charged to the Foam Solution Reservoir (see FIGURE) and while maintaining the foam temperature in the range 186°–194° F. the results as set out in the Table following were obtained.

TABLE

| G/L Ratio SCF/ | Back Pressure, psig | | Remarks | |
|---|---|---|---|---|
| | Solution A | Solution B | Solution A | Solution B |
| Gal. 33.3 | A 2 | B | | |
| | | | | Light foam – breaking in column |
| 25 | | 4 | | Wet foam – breaking at top of column |
| 20 | 8 | 4.5 | Foam over[1] – poor, slumpy | Foam over – wet, fair stability |
| 16.5 | | 5 | | Foam over – |

| | | | |
|---|---|---|---|
| 13.3 | 12 | | Foam over—stiff and stable |
| 10 | 21–25 | 7 | Foam over—very stiff and stable |
| | | | Foam over—excellent stability |
| 6.7 | Plugging | | |
| 5 | Plugging | 9 | Foam over—excellent stability | good stability

¹circulates out of stimulated well, unit 51, via discharge line 53.

These data demonstrate that the addition of a minor amount of a primary intermediate molecular weight straight chain alcohol to a detergent range olefin sulfonate foaming agent markedly reduces the back pressure in the circulation of foams generated from their aqueous solutions. In general, the back-pressure reduction is substantial, i.e., of the order of 35–70 percent and frequently permits the circulation of a foam where otherwise the back-pressure becomes so large as to cause the system to plug.

It will be readily appreciated from the foregoing disclosure and examples that variations can be made by one skilled in the art without departing from the scope and spirit of the appended claims.

We claim:

1. The method for the improvement of the flow characteristics of an air-in-water well circulation foam obtained by the foaming of a foamble solution of an olefin sulfonate, wherein said sulfonate is obtained by the reaction of sulfur trioxide with an olefinic hydrocarbon which contains a single carbon-carbon double bond, is otherwise saturated, and contains from 10 to 20 carbon atoms, followed by neutralization and hydrolysis, which comprises adding to said solution a minor amount of an alcohol of the formula $RCH_2OH$, wherein R is an alkyl group having a carbon atom content in the range 8 to 14, inclusive, and is selected from the class consisting of straight chain alkyls and of alkyls whose sole branching is a methyl group and of mixtures thereof, thereby substantially reducing the back pressure during circulation of said foam in a well relative to the corresponding foam which contains none of said alcohol.

2. The method as in claim 1 further characterized in that said relative amount of said alcohol is in the range from about 10 to 35 parts.

3. The method as in claim 2 further characterized in that said alcohol is selected from the group consisting of $C_{10}$ to $C_{13}$, inclusive, n-alkanols and mixtures thereof, and wherein said olefinic hydrocarbon is selected from the group consisting of terminal alkenes, internal alkenes, and mixtures thereof.

4. The method as in claim 1 further characterized in that said alcohol is 1-dodecanol, in that said sulfonate is obtained by the use of an n-alkene, and in that in parts by weight for each 100 parts of the sulfonate from about 10 to 25 parts of the alcohol is added.

* * * * *